(12) United States Patent
Hillar et al.

(10) Patent No.: US 10,204,286 B2
(45) Date of Patent: Feb. 12, 2019

(54) SELF-ORGANIZING DISCRETE RECURRENT NETWORK DIGITAL IMAGE CODEC

(71) Applicants: Christopher J. Hillar, San Francisco, CA (US); Kilian Koepsell, San Francisco, CA (US); Ram Mehta, Brooklyn, NY (US); Jascha Sohl-Dickstein, San Francisco, CA (US)

(72) Inventors: Christopher J. Hillar, San Francisco, CA (US); Kilian Koepsell, San Francisco, CA (US); Ram Mehta, Brooklyn, NY (US); Jascha Sohl-Dickstein, San Francisco, CA (US)

(73) Assignee: EMERSYS, INC., San Francisco, CA (US)

( * ) Notice: Subject to any disclaimer, the term of this patent is extended or adjusted under 35 U.S.C. 154(b) by 0 days.

(21) Appl. No.: 15/056,528

(22) Filed: Feb. 29, 2016

(65) Prior Publication Data
US 2017/0249536 A1     Aug. 31, 2017

(51) Int. Cl.
*G06K 9/62*    (2006.01)
*G06K 9/36*    (2006.01)
*G06K 9/03*    (2006.01)
*G06K 9/68*    (2006.01)

(52) U.S. Cl.
CPC ................... *G06K 9/6247* (2013.01)

(58) Field of Classification Search
None
See application file for complete search history.

(56) References Cited

U.S. PATENT DOCUMENTS

2017/0230675 A1* 8/2017 Wierstra ............... H04N 19/30

OTHER PUBLICATIONS

Li et al, Discrete-Time Recurrent Neural Networks and Its Application to Compression of Infrared Spectrum, Neural Network World: International Journal on Neural and Mass—Parallel Computing and Information Systems; Prague vol. 21, Iss. 5, (2011): 393-406.*

* cited by examiner

*Primary Examiner* — Randolph I Chu
(74) *Attorney, Agent, or Firm* — Steven M. Greenberg, Esq.; Shutts & Bowen LLP

(57) ABSTRACT

An invention based on learning a discrete recurrent neural network for a given signal domain is described. In one implementation to the domain of visual images, the method can be used to efficiently compress digital photographs and to devise a new perceptual distortion measure between images that well-matches data collected from a human psychophysics experiment. Other applications of the invention include unsupervised detection of recurrent patterns in high-dimensional data and Shannon-optimal error-correcting coding from few training examples.

5 Claims, 13 Drawing Sheets

Exemplary Application:
Image Compression with DRNN Module

Exemplary Domain: Digital Images

Exemplary Application:
Image Compression with DRNN Module

Exemplary Domain: Neural Time-Series Recordings

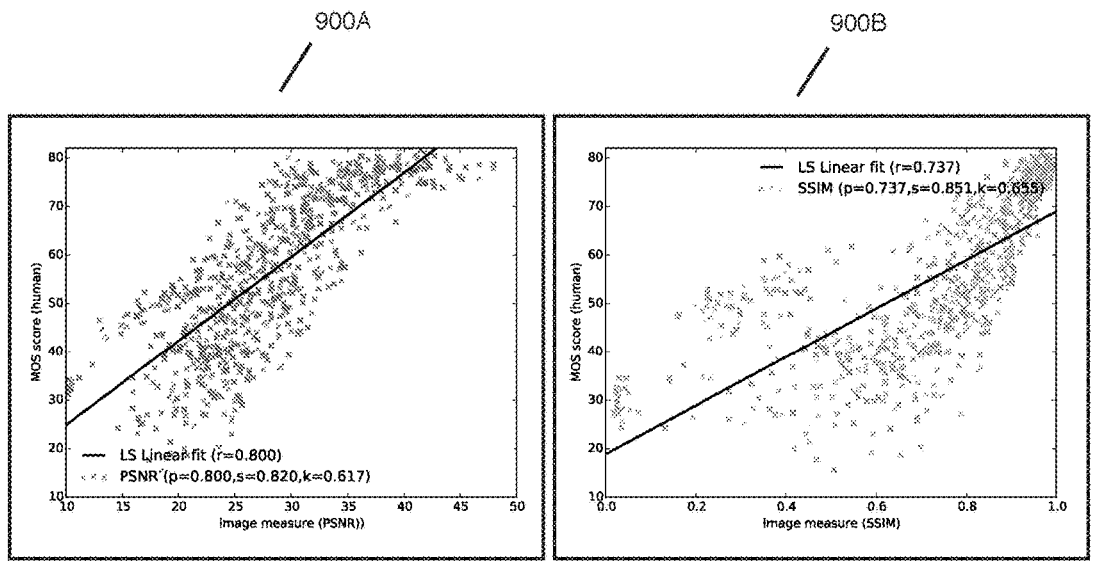
FIG. 9A
FIG. 9B
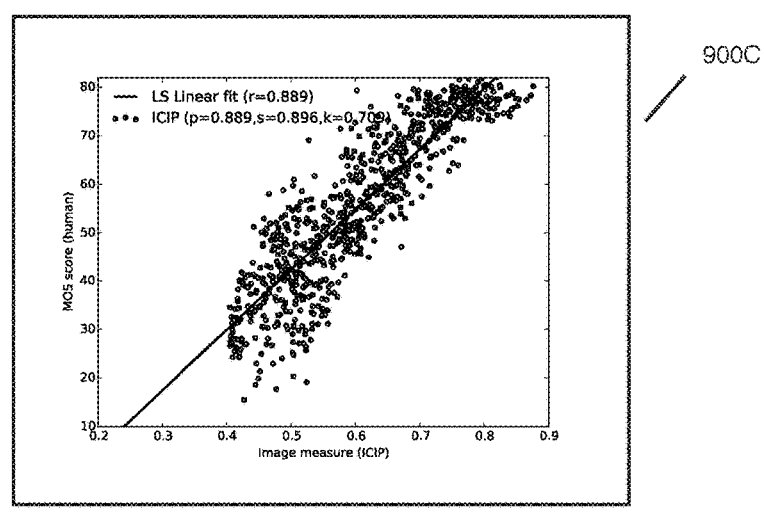
FIG. 9C

SELF-ORGANIZING DISCRETE RECURRENT NETWORK DIGITAL IMAGE CODEC

STATEMENT REGARDING FEDERALLY SPONSORED RESEARCH OR DEVELOPMENT

This invention was made with government support under contract 0917342 with IIS Division of Information & Intelligent Systems awarded by the National Science Foundation. The government has certain rights in the invention.

CROSS-REFERENCE TO RELATED APPLICATIONS

This application claims priority to provisional patent application entitled "Self-organizing discrete recurrent network digital image codec," filed on Feb. 27, 2016 and assigned U.S. Provisional Application No. 62/126,141.

BACKGROUND OF THE INVENTION

Technical Field

The present invention is generally directed to the application of a Discrete Recurrent Neural Network ("DRNN") to solving signal processing tasks. More specifically, the present invention provides a method, implementable in hardware or software, for learning a DRNN to signal domains for the application of solving various signal processing tasks of practical value in ways that significantly further the art.

Description of the Related Art

Processing of natural signals is a crucial component of most technology products. For example, media companies, including but not limited to social networking websites like Facebook, are taxed with hosting many high-resolution images and videos on their servers. Better image and video compression algorithms allow for reduced storage space in the aforementioned servers.

Signal domains have become increasingly more complex, and at the same time larger amounts of data are being sent through the internet, local networks, etc. Thus, it is important to have methods for compressing relevant data in real-time. Moreover, learning structure of data in the desired signal processing domain can and should be exploited for significant practical benefit.

There are several commercially available software and hardware modules for the compression of natural signals. Typically, these existing modules use linear coding to decompose a particular signal ("Image") into a weighted sum of basis functions, e.g. the discrete cosine transform (DCT) basis. The basis functions are sometimes chosen without learning a dictionary from the input data, and the continuous-valued weighting coefficients must be quantized.

Several methods exist for learning internal configurations ("Network Parameters") in neural network approaches to signal processing, including supervised deep learning methods, which use back propagation for training on labeled data. Other methods use Bayesian ideas (e.g. Maximum Likelihood) or sampling (e.g. Contrastive Divergence). Typically, approaches suffer from lack of scalability to high dimensions and often do not learn structure from data in an unsupervised manner.

Those skilled in the art will appreciate the benefits of a convex objective function with an easily computed gradient for high-dimensional discrete DRNN estimation (DRNN "Training" or "Learning"). There are no local minima that hinder training or necessitate random restarts with such an objective function. The tractability of the gradient herein contrasts with more standard procedures, such as maximum likelihood estimation, in that the number of terms to evaluate grows linearly in the number of network nodes, rather than exponentially.

In view of the foregoing, the present invention fulfills technical requirements for a general system, needed in the art, which can efficiently learn structure in a given high-dimensional signal domain in an iterative online fashion ("Online Learning"), and in real-time efficiently utilize this learned structure for feature-extraction, compression, data similarity measurement, clustering and classification, error-correcting coding, among other signal processing tasks of significant practical value.

SUMMARY OF THE INVENTION

The present invention is a method and system for efficiently extracting important features from data and processing them via a computer platform. The user inputs data from a particular signal domain into a platform, such as programming language PYTHON running on a Personal Computer (PC), or other implementations. The platform then trains a DRNN (the "DRNN Module") on user-specified discretization of the data and uses network dynamics to identify states fixed under the action of the network dynamics ("Fixed-points" or "Attractors") of the recurrent neural network, or memories ("Mem"s), for the input data. These memories are lossy perceptual features of input data.

The present invention as described herein implements the DRNN as a Hopfield network (i.e. symmetric McCulloch-Pitts network, auto-associative Perceptron, fully-observable Boltzmann machine) with a probabilistic model of binary data determined by a Lenz-Ising energy-based model. Other implementations are possible in which Hopfield-like networks are constructed such that the underlying probabilistic model includes higher-order correlations.

The present invention as described herein implements the Minimum Probability Flow ("MPF") learning method for training the DRNN, but other training implementations are possible.

Typically, the DRNN operates on smaller decompositions of the signal ("Patches"), which themselves have characteristics ("Patch Statistics"). Depending on application, the user can adjust the discretization of the signal and other characteristics such as image patch specifications (e.g. length of sides for visual patches). When the input signal is a time-series such as an audio recording, the user can adjust the lengths of time-windows in patches and/or discretize the time-series in several possible ways.

Once the user selects a discretization of input data, the memory of any input data is returned as the output of the DRNN dynamics initialized at the discretization of the input. From this, the user can accumulate statistics on the distortion incurred by replacing the initial data with its corresponding memory (or its continuous replacement). These statistics can then be used to evaluate the coding cost of the Hopfield network relative to the achievable lower bound provided by the rate-distortion function. Thus, statistics output by the platform enable the user to validate memories as lossy perceptual features.

The user can also utilize the platform to compute the entropy rate of the initial data, the entropy rate of the corresponding fixed-points, and the number of memories as a function of the amount of input data. In various signal domains, the number of memories grows super-linearly with the size of the neural network, indicating that the incoming signals have sparse or other structure that increases the memory capacity of these networks. The dynamics used to obtain the memory or feature corresponding to an initial condition often converge very quickly, so that this neural network provides an efficient "look-up table" which maps the original data to memories of the DRNN.

Existing approaches to identifying lossy perceptual features often rely on linear coding, in which the data is expressed as a truncated sum of weighted basis functions. In the present invention, these basis functions are replaced by memories of the DRNN trained on data. The user's discretization scheme, when properly chosen, endows these memories with sufficient expressive power to avoid standard quantization algorithms. Thus, the memories of the DRNN with appropriate discretization have reduced coding cost relative to other standard methods for compressing and modeling signals.

The user can access different levels of loss ("Distortion") in compression by tuning various hyperparameters, including but not limited to those mentioned earlier, related to the discretization scheme, and thus interpolate between storing features producing high distortion and those that are nearly lossless. In other words, users can choose the acceptable level of perceptual distortion, and the DRNN Module can achieve that level by careful setting of hyperparameters.

BRIEF DESCRIPTION OF THE DRAWINGS

FIGS. 9A, 9B, and 9C, taken together, illustrate effectiveness of present invention for measuring distance between pairs of digital photographic images that is in accordance with human perception.

DETAILED DESCRIPTION OF THE EXEMPLARY EMBODIMENTS

Figure 1:
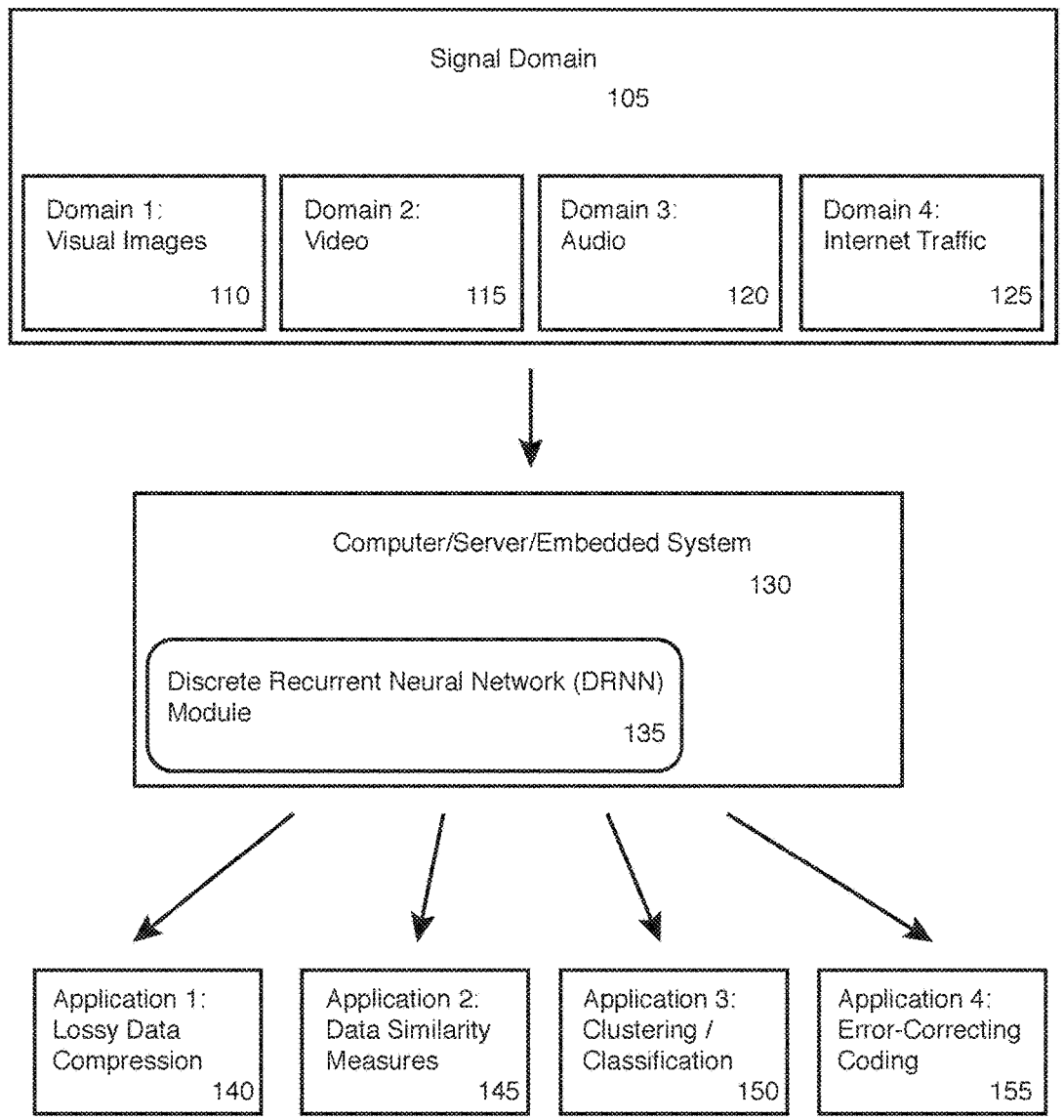
FIG. 1 is a diagram illustrating the context of the invention and application domains.

The present invention allows for a method to extract information out of signal domains and apply such knowledge to solve specific signal processing tasks of significant practical value.

Although the exemplary embodiments will be generally described in the context of software modules running in a distributed computing environment, those skilled in the art will recognize that the present invention also can be implemented in conjunction with other program modules for other types of computers. In a distributed computing environment, program modules may be physically located in different local and remote memory storage devices. Execution of the program modules may occur locally in a stan-alone manner or remotely in a client/server manner. Examples of such distributed computing environments include local area networks of an office, enterprise-wide computer networks, and the global internet.

The detailed description that follows is represented largely in terms of processes and symbolic representations of operations in a distributed computing environment by conventional computer components, including remote file servers, remote computer servers, remote memory storage devices, a central processing unit (CPU), memory storage devices for the CPU, display devices and input devices. Each of these conventional distributed computing components is accessible by the CPU via a communications network.

The processes and operations performed by the computer include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

The present invention also includes implementation of a computer program, which embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement the disclosed invention without difficulty based on the flow charts and associated description in the application text, for example. Therefore, disclosure of a particular set of program code instructions is not considered necessary for an adequate understanding of how to make and use the invention. The inventive functionality of the claimed computer program will be explained in more detail in the following description in conjunction with the remaining figures illustrating the program flow.

Referring now to the drawings, in which like numerals represent like elements throughout the several figures, aspects of the present invention and the preferred operating environment will be described.

FIG. 1 illustrates various exemplary method contexts in which the present invention is designed to operate. Those skilled in the art will appreciate that FIG. 1 and the associated discussion are intended to provide a brief, general description of various signal domains and exemplary applications of the present invention.

FIG. 1 illustrates various exemplary signal domains and exemplary applications of present invention. FIG. 1 comprises a signal domain 105, such as but not limited to photographic images 110, video 115, audio 120, and Internet traffic 125. Data from such a domain is processed by an exemplary computing environment 130 which implements a DRNN Module 135. The computing environment may be a personal computer, a server, an embedded system, or hardware. FIG. 1 illustrates exemplary applications such as but not limited to data compression 140, data similarity measures 145, clustering and classification 150, and error-correcting codes 155.

In one exemplary embodiment, we illustrate application 140 to signal domain 110. However, as noted above, the invention should not be construed as limited to any one application or domain. Further, a skilled programmer would be able to write such a module to implement the disclosed invention without difficulty based on the flow charts, and associated description in the application text, for example. Therefore, disclosure of a particular set of program code instructions, such as in programming language PYTHON, is not considered necessary for an adequate understanding of how to make and use the present invention.

Exemplary Overview of Process

Figure 2:
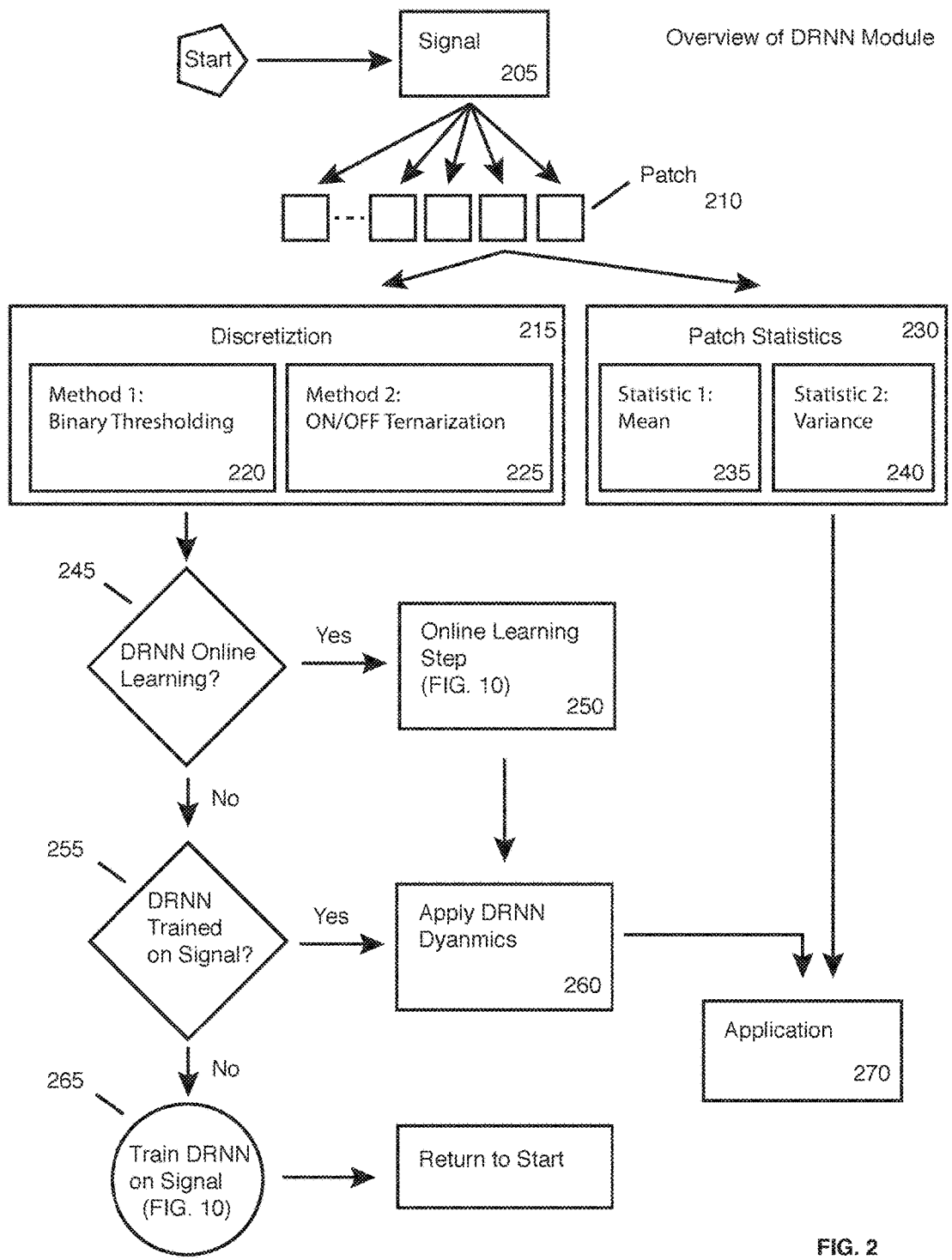
FIG. 2 illustrates the components parts of the present invention.

Referring now to FIG. 2, an overview of the DRNN Module is illustrated corresponding to 135. The signal 205 from an exemplary signal domain is converted into patches 210. Patch statistics 230 are extracted from each patch. Exemplary statistics such as but not limited to the patch mean 235 and patch variance 240 are extracted for use in the application 270. A discretization step 215 is then performed on the patch. Exemplary discretization methods include binary thresholding 220 and ON/OFF ternarization 225, but several other discretization steps may be applied.

FIG. 2 illustrates various options after the discretization step 215. If DRNN Online Learning 245 is enabled, then "YES" branch will be followed to an Online Learning Step 250. Otherwise, if DRNN online learning 245 is not enabled then "NO" branch is followed to 255. If a DRNN is already trained on the Signal, then the "YES" branch is followed to apply DRNN Dynamics 260 and the result is provided to the application 270. Otherwise, if a DRNN has not been trained on the Signal, then "NO" branch is followed to train DRNN on the Signal as further illustrated in FIG. 10.

Figure 3:
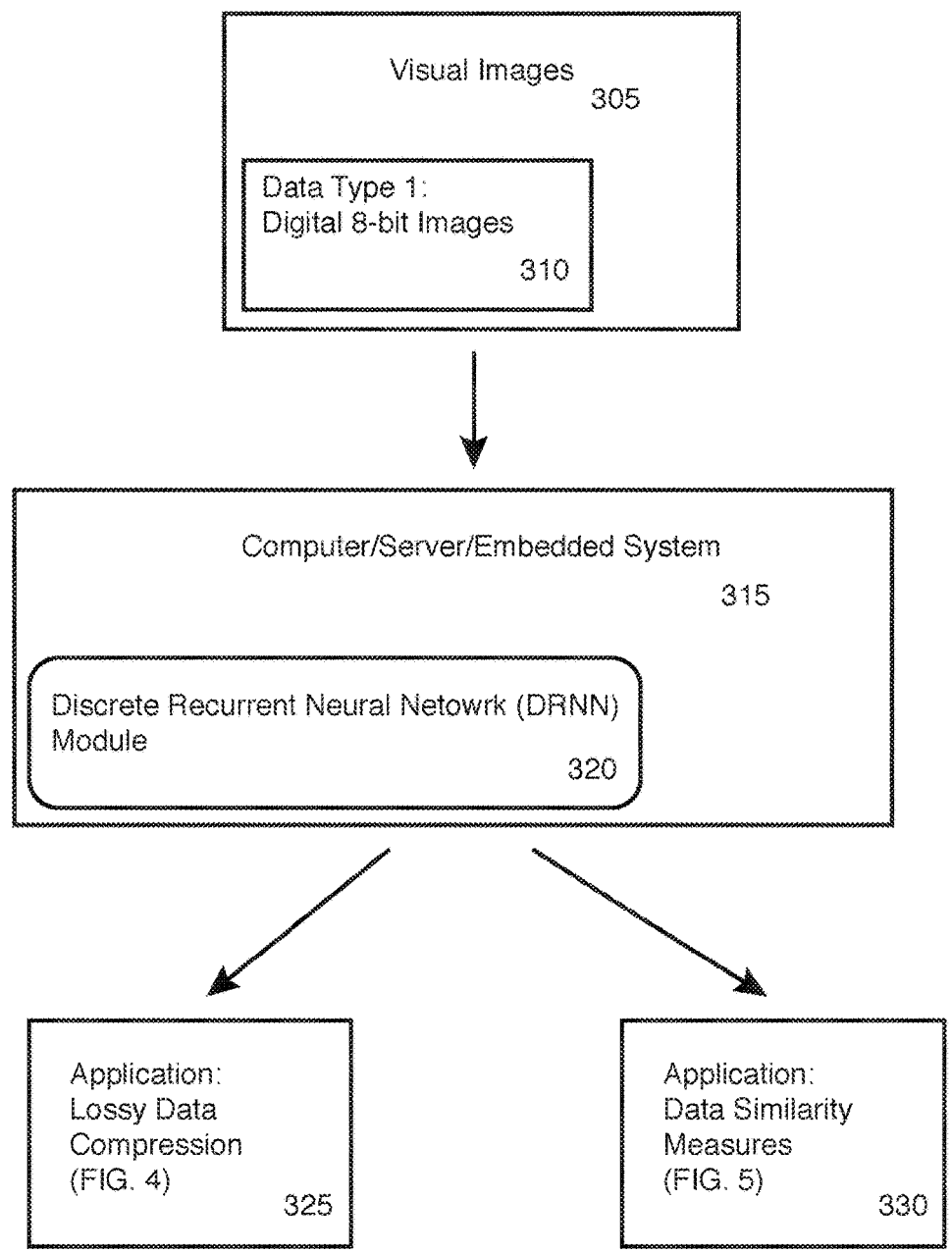
FIG. 3 illustrates the application of present invention to the signal domain of natural digital images.

FIG. 3 illustrates an exemplary signal domain with multiple practically relevant exemplary applications. Exemplary data in the form of 8-bit digital photographic images 310 are taken from the exemplary domain of visual images 305. These are operated upon by a DRNN Module 320, which is implemented in exemplary computing environment 315. The computing environment may be executed through personal computer, server, embedded system, or hardware implementations. FIG. 3 illustrates application 140 for for data compression of visual images 325 and application 145 for digital photographic image similarity measurement 330. These exemplary applications are illustrated in FIG. 4 and FIG. 5 in particular detail.

Exemplary Applications According to the Invention

Figure 4:
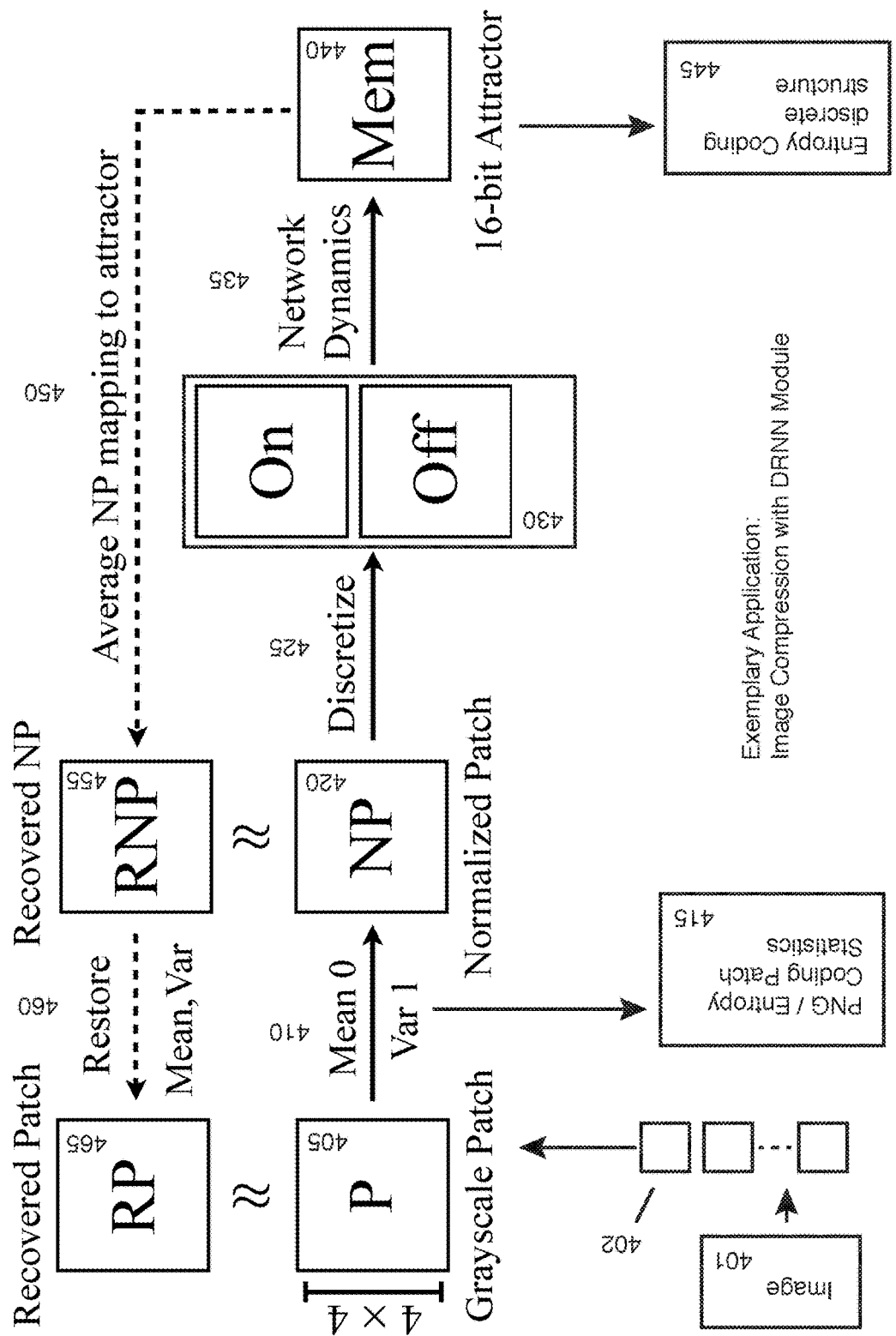
FIG. 4 illustrates digital photographic image compression using present invention.

FIG. 4 illustrates an exemplary application of data compression for the exemplary domain of digital photographic images. FIG. 4 illustrates the component parts of compressing image 401 with present invention. The image 401 is first converted to patches 402. An exemplary patch from the image is also illustrated 405. Patch statistics are extracted from the patch 410. This illustrates an exemplary case of extracting patch statistics as shown in 230 of the DRNN Module overview as illustrated in FIG. 2. The extracted statistics are encoded using an entropy coding scheme or as a PNG or other common image format 415. Extracted statistics are removed from the patch 405 to produce a normalized patch NP 420. The normalized patch is then discretized 425 using an ON/OFF discretization scheme 430. This illustrates an exemplary case of discretizing patches as shown in 215 from FIG. 2. Dynamics 435 of the DRNN are applied to obtain a discrete memory 440 of the network (attractor of the DRNN) that is entropy coded. To obtain a recovered patch RP closely matching original patch 405, all NPs from a database of photographic images converging to 440 are averaged to obtain a recovered normalized patch RNP; patch statistics extracted in 410 are then restored 460 to obtain RP 465.

Figure 5:
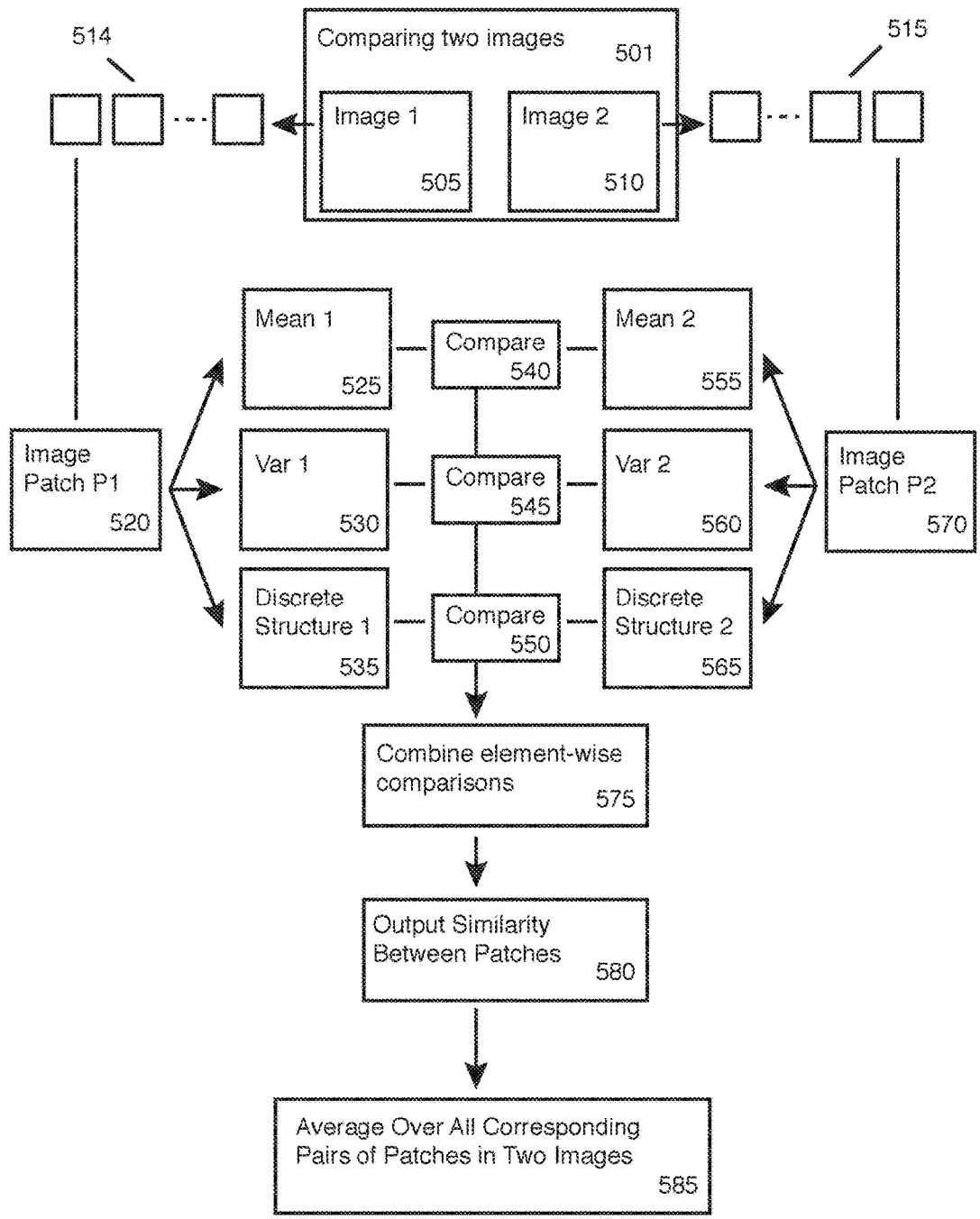
FIG. 5 illustrates using present invention for measuring distance between images.

FIG. 5 illustrates exemplary application 145 of present invention to perceptual similarity measurement for the exemplary signal domain of visual images. As FIG. 5 illustrates, a comparison between Image 1 505 and Image 2 510 is being made. The method starts by converting 505 and 510 into patches 514 and 515, resp. Exemplary patch 520 from Image 1 is processed by extracting its mean 525, variance 530, and its discrete structure 535, while an exemplary patch 570 from Image 2 is processed by extracting mean 555, variance 560, and discrete structure 565. As FIG. 5 illustrates, the means 525 and 555 are compared to each other in 540, as the variances 530 and 560 in 545, and the discrete structures 535 and 564 in 550. The comparisons 540, 545, and 550 are combined 575 to output 580 the similarity between patches 514 and 515. Finally, an average 585 over all corresponding similarities for patches 580 is calculated in 580.

Figure 6A:
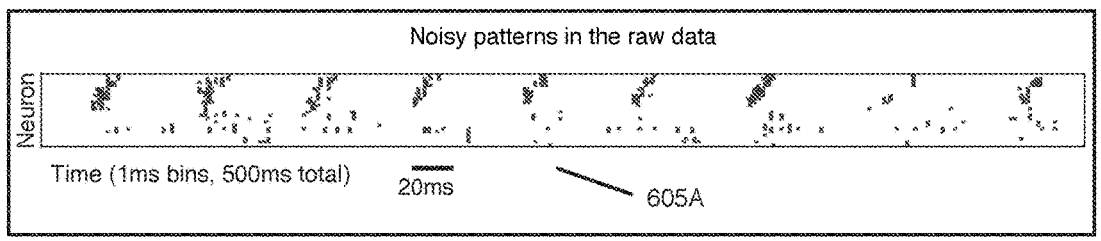
FIGS. 6A, 6B and 6C, taken together, illustrate the practical utility of present invention for unsupervised clustering in the exemplary signal domain of neural recordings from scientific experiments.

Referring to FIG. 6ABC, application of present invention to unsupervised clustering 150 is illustrated, demonstrating discovery of recurrent patterns of activity in the exemplary signal domain of electrophysiological recordings of neurons.

FIG. 6A shows spike trains 605A for 500 ms of 21 neurons with rhythmic spiking patterns.

Figure 6B:
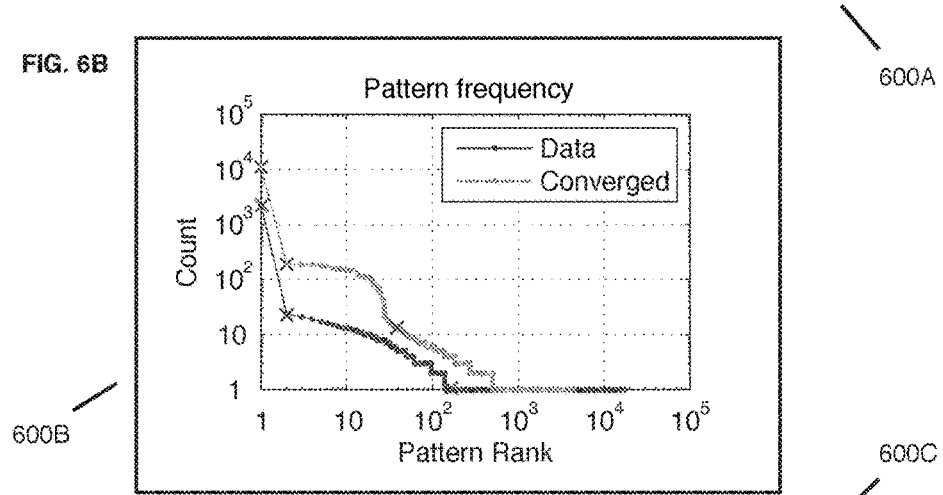

FIG. 6B shows that after applying present invention, a large number of states in the data that occur infrequently are summarized by a small number of patterns in the network.

Figure 6C:
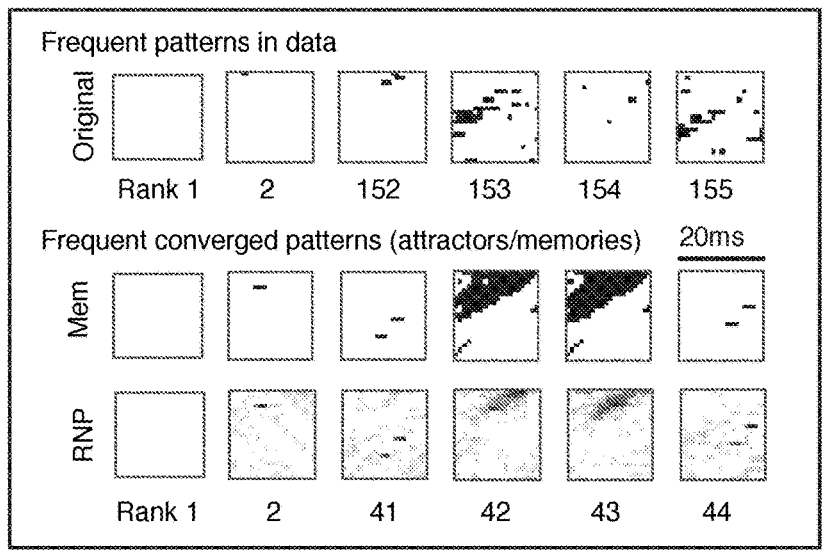

FIG. 6C shows converged patterns of a DRNN encode the envelope of the 'chirp' pattern in 605A. Clean versions (Mems) of the most salient patterns occurring in the data are obtained by computing memory averages (RNPs) from the trained DRNN, as in 455 from FIG. 4.

FIGS. 7A, 7B, 7C, and 7D, taken together, illustrate application 155 of present invention to the domain of binary signals; implementation and theory details for this application are in Ref. [H].

Figure 7A:
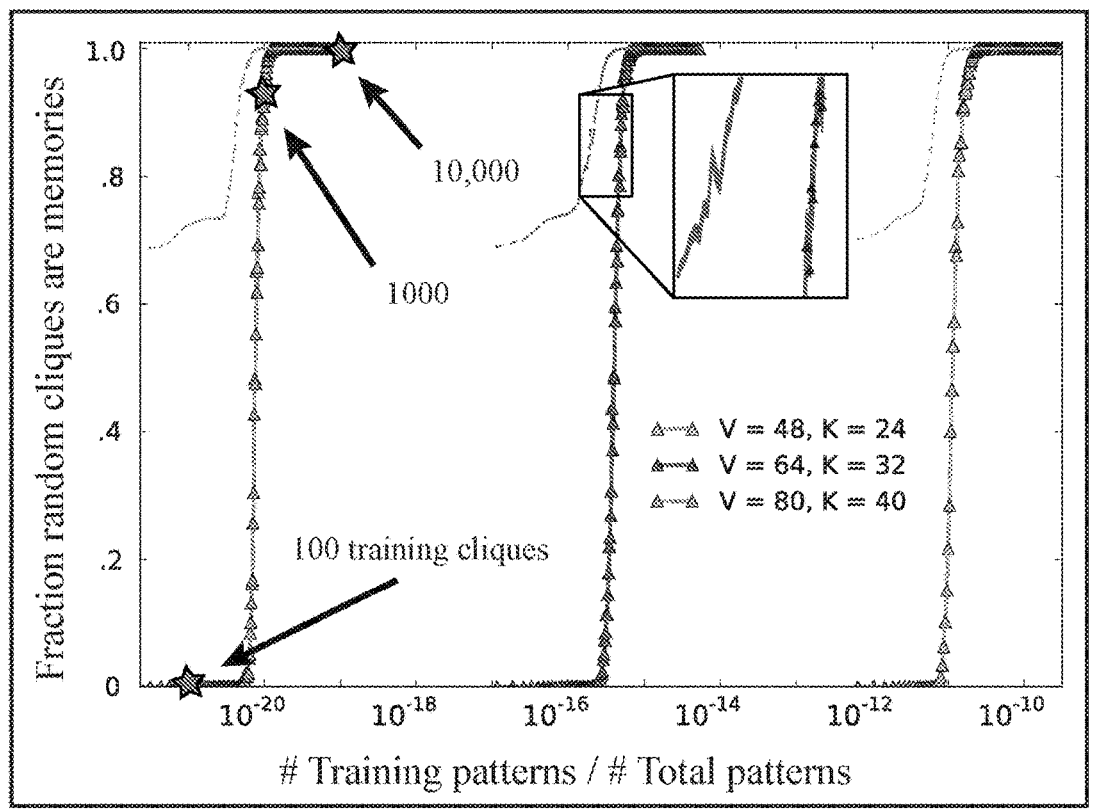
FIGS. 7A, 7B, 7C, and 7D, taken together, illustrate application of present invention for signal domain of binary error-correcting codes.

FIG. 7A illustrates the learning of network parameters storing large numbers of binary patterns in a DRNN implementation of present invention.

Figure 7B:
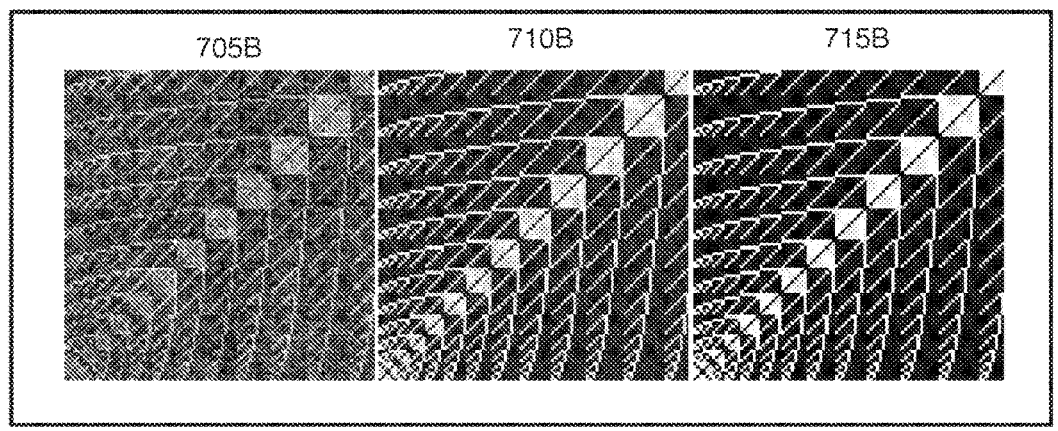

FIG. 7B displays portions of the network coupling parameters for the three networks pointed to in 700A. DRNN parameters 705B, 710B, and 715B are the result of training DRNN on 100, 1000, and 10000 data points (resp.) from the exemplary signal domain of binary graphs. As shown in the plot of 700A, the number of training patterns to determine network parameters 715B that achieve perfect memorization of all binary patterns is only a tiny fraction of the total number of patterns stored in the network.

Figure 7C:
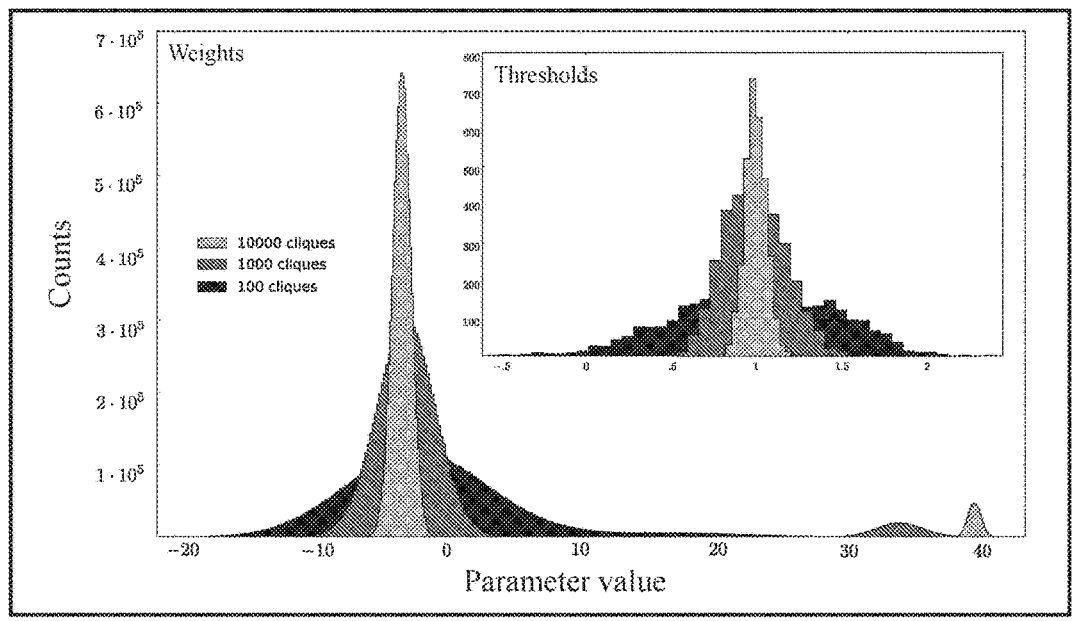

FIG. 7C shows plot of histograms for DRNN parameters learned in 700A; it can be seen that few training samples determine parameters around critical values.

Figure 7D:
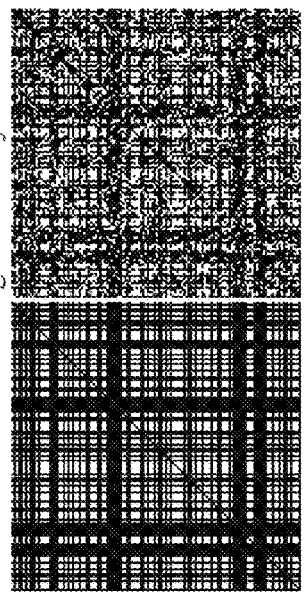

FIG. 7D illustrates exemplar error-correcting coding performance of present invention. Binary code words Clique 1 720D, Clique 2 725D, and Clique 3 730D are corrupted by noise to arrive at Hidden Clique 1 705D, Hidden Clique 2

710D, Hidden Clique 3 715D. Converging DRNN dynamics on 705D, 710D, 715D results in exact recovery of original inputs, demonstrating diverse storage and robust error-correction.

Figure 8A:
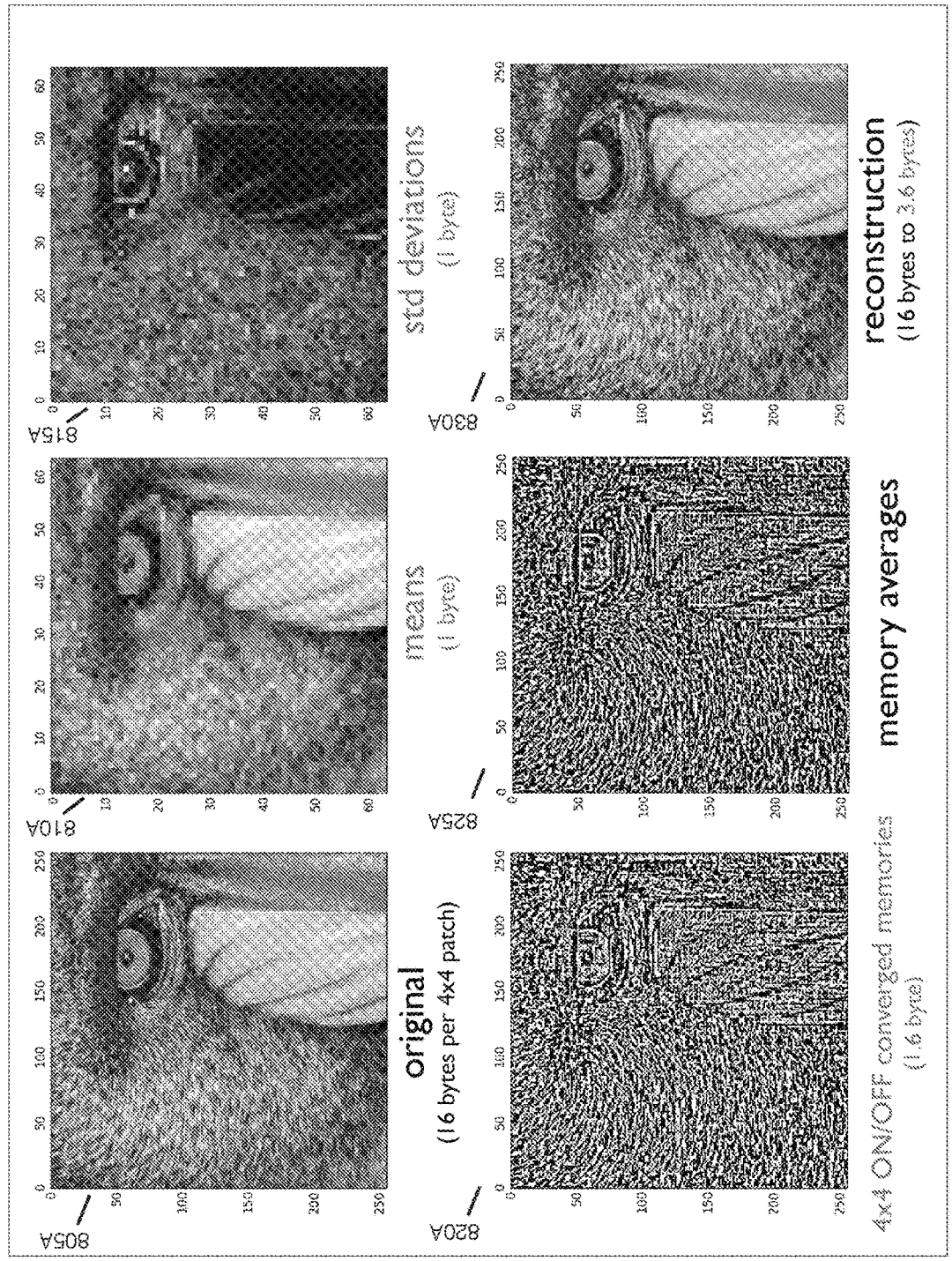
FIG. 8A illustrates an exemplary application of present invention for compressing a specific digital photographic image signal.

Referring now to FIG. 8A, illustrated are the results of each step of the compression application outlined in FIG. 4 for an exemplar digital photographic image, 8-bit grayscale baboon image 805A, standard for the art. Extracted statistics of each patch are shown in 810A and 815A. Shown in 820A is the result of converging network dynamics on non-overlapping patches as described in 435 after ON/OFF discretization as described in 430. To produce image 825A, each patch from 820A was replaced by its corresponding RNP, corresponding in FIGS. 4 to 455 being produced from the discrete structure 440. Restoring patch statistics from 810A and 815A to the RNPs from 825A results in reconstruction 830A of the image 805B. Exemplary application of the present invention, implemented on a computer in software, as illustrated in FIG. 8A, compressed each patch of the original image 805A from 16 bytes to 3.6 bytes on average, demonstrating state-of-the-art in exemplary application of present invention to compression application in the signal domain of digital photographic images.

Figure 8B:
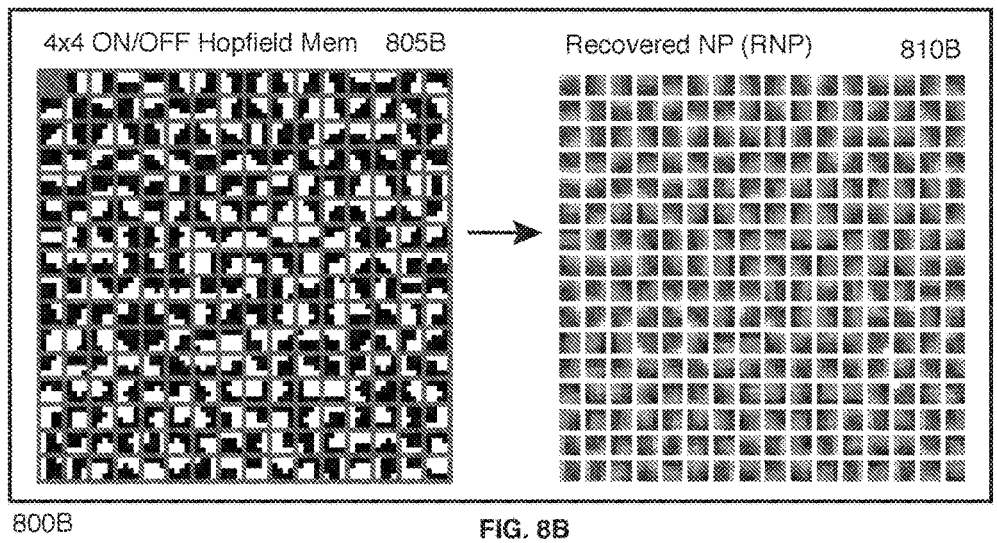
FIG. 8B illustrates exemplary discrete and recovered continuous components in practical implementation of method illustrated in FIG. 4.

FIG. 8B illustrates exemplary subset of memories Mem 805B and their recovered normalized patches RNP 810B in exemplary implementation of method of FIG. 4 to exemplary photograph 805A from FIG. 8A. Shown in 805B are the top occurring 256 (of 65535 total) 4×4 ON/OFF 32-bit memories 805B, arranged in a grid of 16 by 16 patches, and their corresponding average grayscale RNPs 810B, arranged in the same ordering as in 805B. In 805B, white pixels represent (ON,OFF)=(1,0), black pixels represent (ON,OFF)=(0,1), and gray pixels represent (ON,OFF)=(0,0).

Figure 8C:
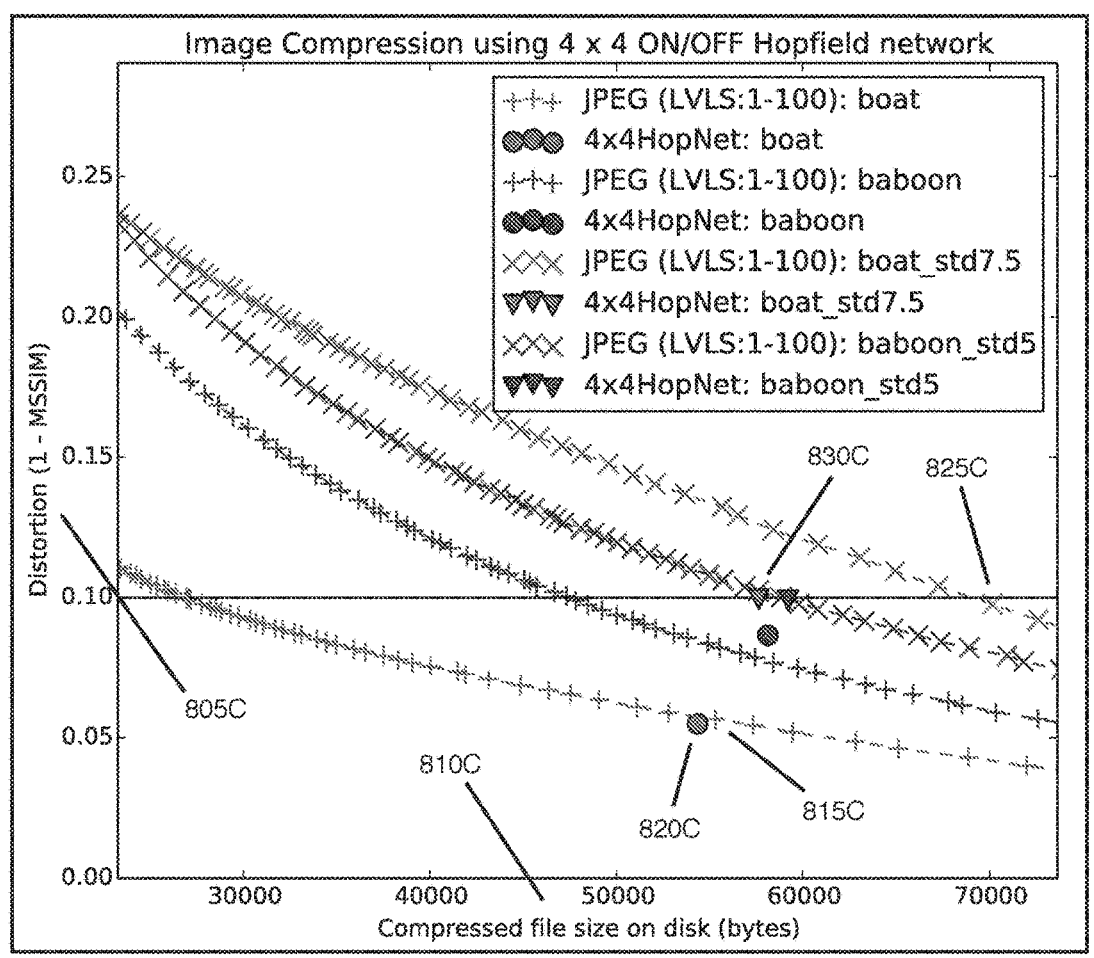
FIGS. 8C and 8D, taken together, illustrate practical effectiveness and mathematical near-optimality, resp., of application of invention to compression of digital photographic images.

FIG. 8C shows rate-distortion performance of image compression using the present invention, implemented in software on a computer, versus art, which is described in more detail in Ref. [HMK]. The y-axis represents perceptual distortion measure 805C, as calculated in Ref. [W], as applied to different compressions of photographic images in the art. The x-axis shows the compressed file size on disk in bytes 810C. Item 800C illustrates a plot of the rate-distortion performance of compressing standard images with JPEG or with "4×4HopNet" DRNN implementation of present invention as detailed in FIG. 4 and application 140 from FIG. 1. As illustrated in 800C, exemplar DRNN coding of "boat" has improved coding 820C versus JPEG 815C. More significant coding using present invention is illustrated by DRNN 830C versus JPEG 825C; an 18% reduction in coding rate is seen for this implementation of present invention versus JPEG.

Figure 8D:
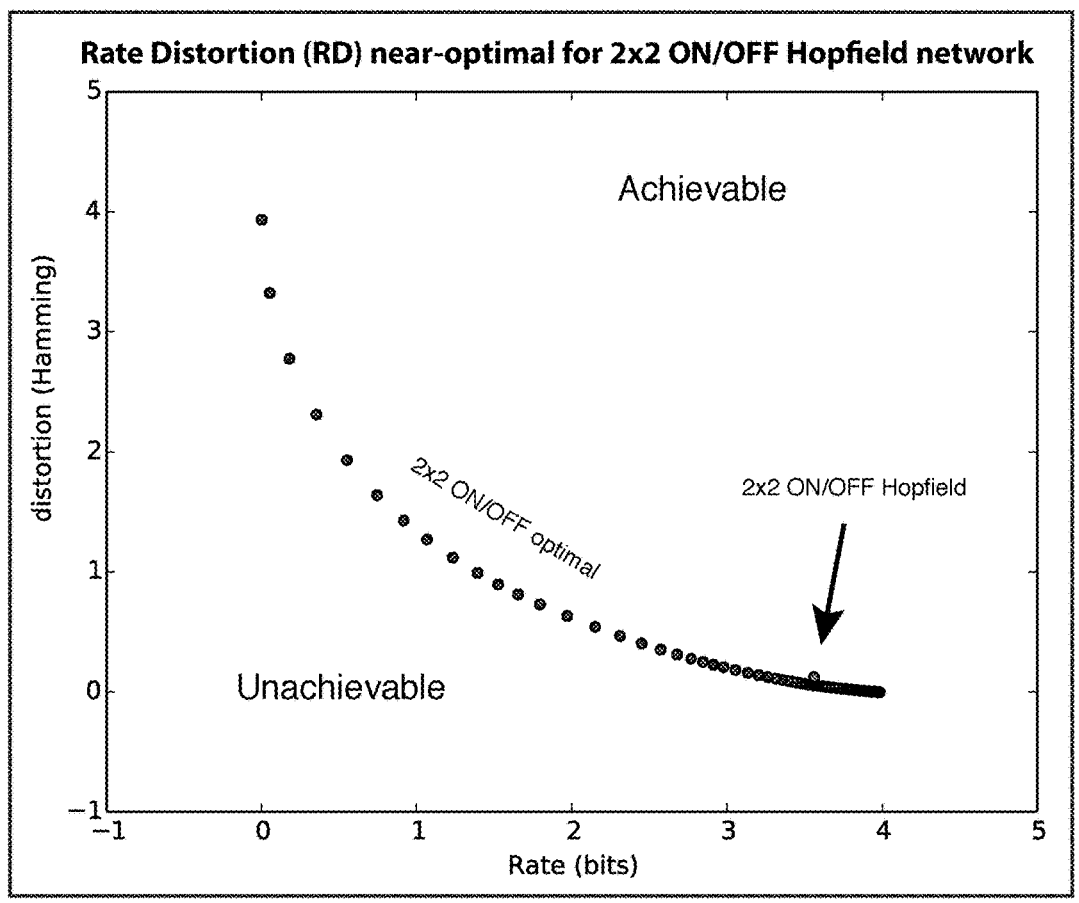

FIG. 8D shows the optimal rate-distortion codebooks for encoding 2×2 ON/OFF patches using an implementation of present invention. Coding scheme determined by training a DRNN on natural photographic images is shown to be near-optimal, as calculated using methods from information theory (see technical details in Ref. [MMH]).

FIGS. 9A, 9B, and 9C, taken together, show results for PSNR, SSIM (Ref. [W]), and use of DRNN Module 135 for digital photographic image measurement, as compared to human perceptual determination ("MOS" score; LIVE Image Quality Assessment Database, Laboratory for Image and Video Engineering, Austin, Tex.). Highest correlation with human psychophysics experiment scores is demonstrated using an exemplar implementation of application 145 to visual images signal domain, as described in FIG. 5. Exemplar implementation of present invention ("ICIP image measure" in 900C) results in highest correlation between derived image measure and human MOS scores, as quantified by Pearson ("p"), Spearman ("s"), and Kendall ("k") correlation coefficients in the legends of plots in 900A, 900B, and 900C.

Exemplary Sub-Processes of FIG. 2

Figure 10:
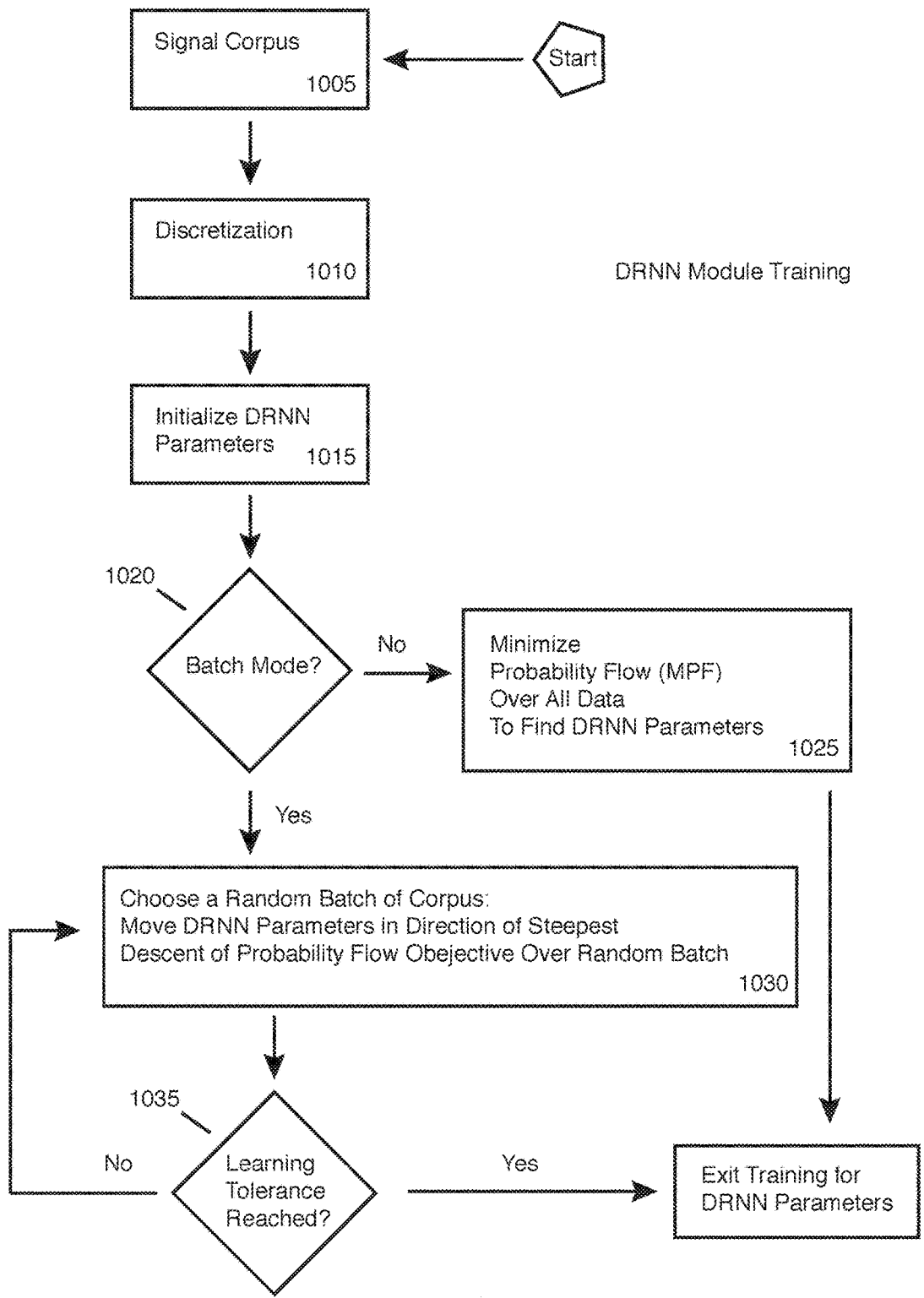
FIG. 10 illustrates the DRNN training sub-process of the present invention.

Referring to FIG. 10, a workflow is given of training of DRNN Module 135 on a signal domain, as sub-process 265 of DRNN Module overview in FIG. 2. A corpus of Signal 1005 from an exemplary signal domain is used for training. Data from the corpus is discretized 1010 using discretization schemes such as the exemplary schemes in 215. The parameters (weights; thresholds) of the DRNN are initialized 1015 in preparation for training. If batch mode 1020 is not enabled, the probability flow is minimized over all data, as detailed in technical Refs. [HMK, H], to find parameters for the DRNN 1025 and the training is complete. If batch mode 1020 is enabled, then "Yes" branch is followed and DRNN Parameters are moved in the direction of the steepest descent of probability flow objective over a random batch from the corpus 1030, as also detailed in technical Ref. [H]. If the specified learning tolerance is not reached, then branch "No" is followed, and the DRNN parameters are moved again according to 1030. Otherwise, "Yes" branch is followed and training is complete. Those skilled in the art will appreciate that online learning step 250 in DRNN Module overview in FIG. 2 is a special case of batch learning 1030.

CONCLUSION

In conclusion, the present invention enables several applications of a DRNN Module trained to extract information of practical value from several signal domains.

It will be appreciated that the present invention fulfills the needs of the prior art described herein and meets the above-stated objects. While there has been shown and described the preferred embodiment of the invention, it will be evident to those skilled in the art that various modifications and changes may be made thereto without departing from the spirit and the scope of the invention set forth in the appended claims and equivalence thereof. Although the present invention has been described as operating on the specific signal domains described herein, it should be understood that the invention can be applied to other types of signal domains such as audio, video, user meta-data, internet traffic, etc.

What is claimed is:

1. A method for processing image data comprising the steps of:

training by a processor of a computer, a fully-visible non-continuous, discrete state recurrent neural network (DRNN) by deconstructing an input image into a series of non-overlapping patches, each patch comprising elements of an image populating the neural network with different parameters based upon the non-overlapping patches by iterating a learning rule comprising minimum probability flow over the parameters so as to produce a trained DRNN;

storing the trained DRNN in fixed storage of a computer;

executing an image processor in memory of the computer, the image processor loading the trained DRNN from the fixed storage, selecting different images from fixed storage, discretizing each different image into a multiplicity of non-overlapping patches, extracting patch statistics from each of the patches to produce corresponding normalized patches, encoding the extracted statistics using an entropy coding scheme, discretizing the normalized patches using an ON/OFF discretization scheme and iteratively transforming the multiplicity of discretized patches with the trained DRNN, the transformation producing corresponding transformed images; and, storing each transformed image along with the encoded extracted statistics in fixed storage.

2. The method of claim 1, wherein the DRNN is implemented as a Hopfield network.

3. The method of claim 1, wherein the images are images of neural spike trains.

4. The method of claim 1, wherein the images are video images composed of time-serialized patches that are lossily compressed.

5. The method of claim 1, further comprising:

clustering each single vector without specification of a number of clusters.

* * * * *